June 18, 1940.　　　W. W. TIMMIS ET AL　　　2,205,001
RADIANT HEATING MEANS
Filed Dec. 16, 1937　　　4 Sheets-Sheet 1
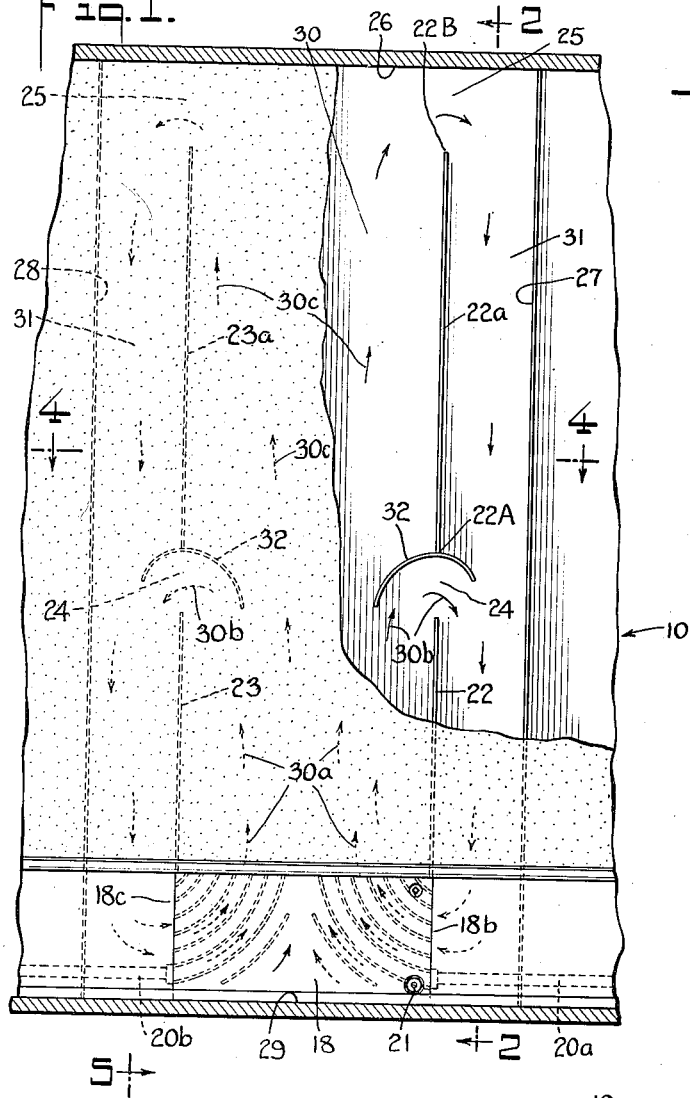
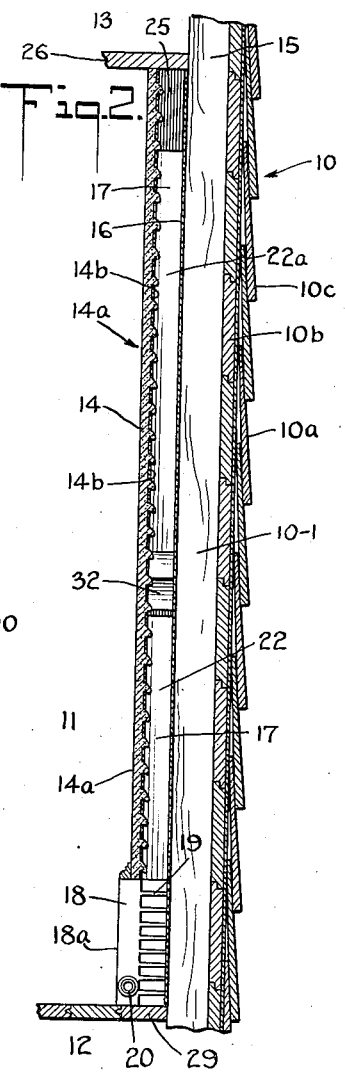
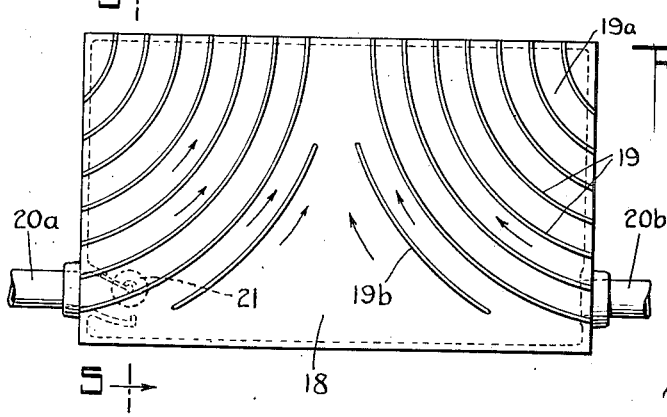
INVENTORS
WILLIAM WALTER TIMMIS
MAURICE A. MICHAELS
THEIR ATTORNEY

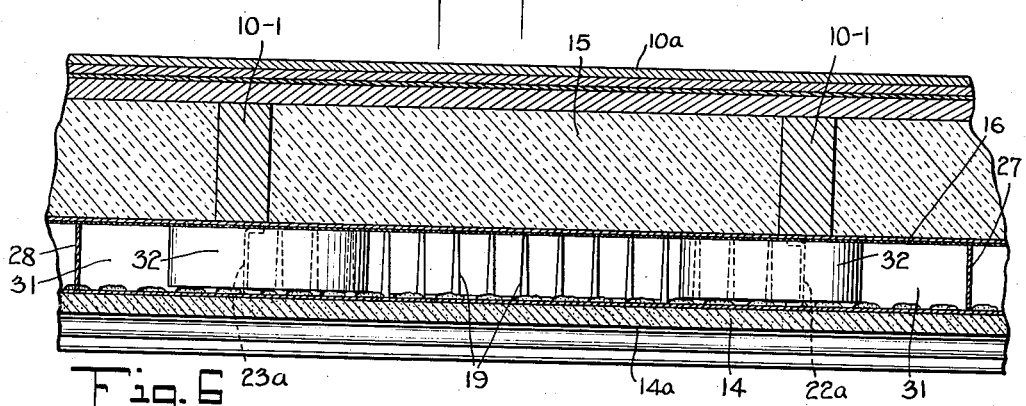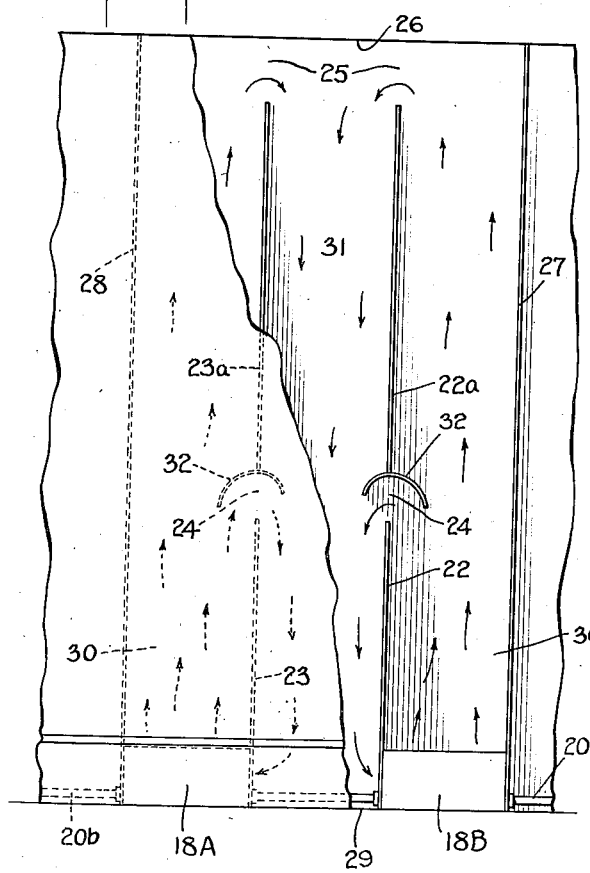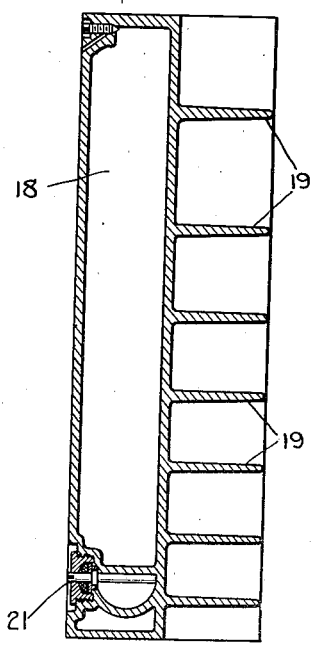

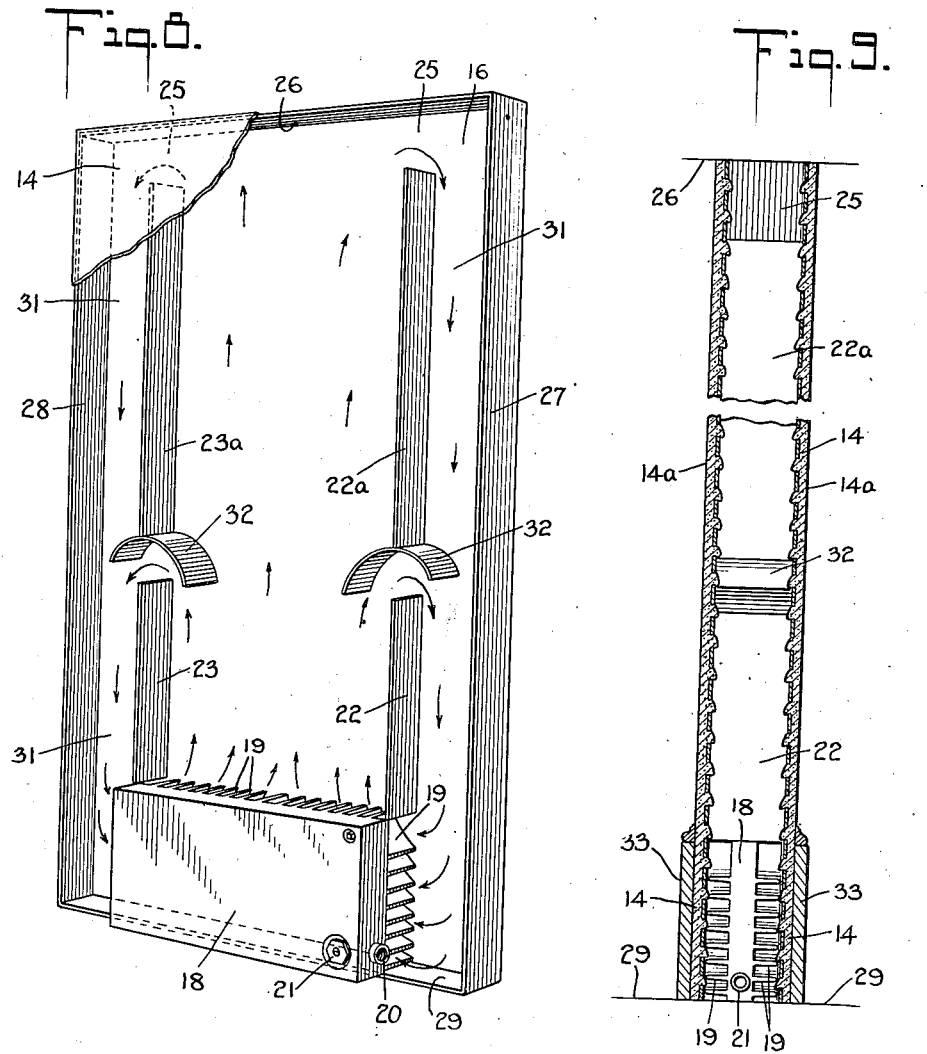
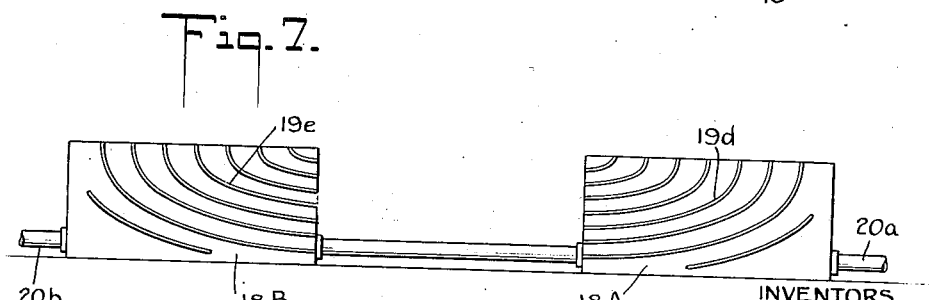

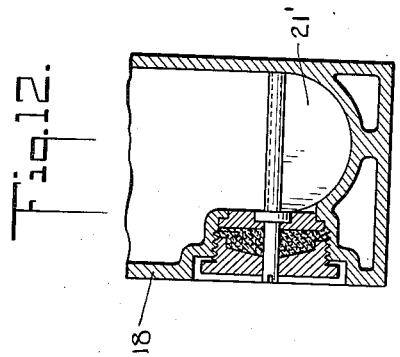
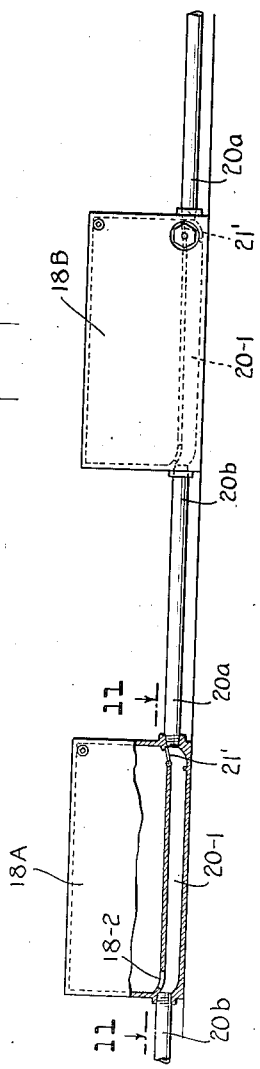
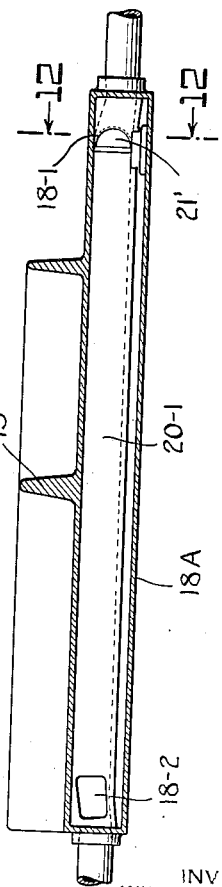

Patented June 18, 1940

2,205,001

UNITED STATES PATENT OFFICE 2,205,001

RADIANT HEATING MEANS

William Walter Timmis, Glen Cove, and Maurice A. Michaels, Bronx, N. Y., assignors, by mesne assignments, to American Radiator & Standard Sanitary Corporation, New York, N. Y., a corporation of Delaware Application December 16, 1937, Serial No. 180,124

9 Claims. (Cl. 237—1)

This invention relates to heating means for the rooms of building structures and the like, and it relates more particularly to that type of heating means which when installed forms a part of the wall structure of a room and which functions to heat the room space by radiation of heat energy from the surface of such part of the wall structure which is exposed to the room.

One of the objects of the invention is to provide heating means of the above character which is of improved construction and arrangement of parts and which performs its function of heating a room in a highly efficient manner.

According to one of the preferred embodiments of our invention, we provide an upright hollow side wall structure for a room, containing therein a fluid medium, such as air, which is capable of absorbing and giving up heat energy by convection. The side wall structure is preferably air tight and is divided interiorly into up-going and down-coming passages which communicate at their upper and lower ends, respectively, to provide a closed continuous flow path for the fluid medium, which path extends in directions substantially parallel to the plane of the side wall structure. We provide within the lower part of the up-going passage, a heat-emitting device which is contacted by the fluid medium. Thus, the fluid medium circulates by gravity along the closed path and in so doing absorbs heat energy from the heat-emitting device and gives up such heat to the side wall structure from where it is radiated into the interior of the room spaces.

Further features and objects of the invention will be more fully understood from the following detail description and accompanying drawings, in which—

Fig. 1 is an elevation, partly broken through, of a panel embodying a preferred form of the invention, the applied arrows indicating paths of air flow.

Fig. 2 is a vertical section taken on line 2—2 of Fig. 1.

Fig. 3 is an elevation of a preferred form of air-flow-activating device, viewed from the rear.

Fig. 4 is a horizontal sectional view on line 4—4 of Fig. 1, on a somewhat enlarged scale.

Fig. 5 is a vertical sectional view on line 5—5 of Fig. 3.

Fig. 6 is an elevation, partly broken through, similar to Fig. 1, but illustrating another embodiment of the invention.

Fig. 7 is a detail view illustrating the radiators of Fig. 6 in rear elevation.

Fig. 8 represents an embodiment of the invention arranged in assembly as a commercial unit. The view discloses the interior of the unit.

Fig. 9 is a central vertical section of another embodiment of the invention applied to effect radiant heating from opposite faces of a wall, partition or the like.

Fig. 10 is a detail view of the radiators of Fig. 6 as connected in series. The radiators are illustrated in front elevation with a portion of their front walls broken away to reveal a by-pass arrangement.

Fig. 11 represents a horizontal section taken on the line 11—11, Fig. 10.

Fig. 12 represents a fragmentary vertical section taken on the line 12—12, Fig. 11.

Referring to Figs. 1, 2, 3, 4 and 5, the wall indicated generally by 10 may represent an outer wall of a building, a room or other enclosure indicated at 11. The floor line of such room is indicated at 12 and its ceiling line is indicated at 13. The outer facing materials of such outer wall 10 may be as desired. As indicated in Fig. 2 such outer facing materials represent clap boards 10a and sheathing boards 10b, the latter being applied directly to studding 10—1. The inner facing material, indicated at 14, of such outer wall 10, may be as desired; as indicated in Fig. 2, such inner facing material 14 is plaster which is suitably held in position, as by expanded metal lathing indicated at 14b, or the like.

Also, desirably, and in cooperative relation with the instrumentalities attaining the purposes of this invention, material effecting reflection of radiant heat energy, such as aluminum foil mounted on paper or the like, indicated at 16, is preferably applied to the inner surface of the studding 10—1 to form a septum interposed between the sheathing 10b and the inner facing material 14 to define an air-flow-activating chamber within the wall. The foil serves to reflect the heat away from the outer wall structure, and toward the inner wall structure or panel 14.

Desirably, to minimize heat losses, suitable insulating material such as rock wool, as indicated at 15, is interposed between the outer facing materials 10a, 10b, and the septum 16.

The air-flow-activating chamber is indicated at 17, and, as appears more fully hereinafter, is suitably rendered substantially air-tight throughout.

Suitably disposed with relation to the entrapped air of such substantially air-tight chamber 17, is a heat emitting, i. e. air-flow-activating, device indicated at 18, which may be suitably arranged, usually by provision of a hollow interior and suitable means communicating with such hollow interior, for the inflow and circulation therethrough of a thermal fluid such as heated water, steam, or the like and preferably having extended surfaces such as heat exchange fins, indicated at 19, suitably projecting within such air-flow-activating space 17.

If desired, and as is illustrated, such air-flow-activating device 18 may have a face portion serving per se as heat radiant means, which face portion, indicated at 18a, may be disposed in suitable alignment with the exposed face 14a of the inner wall material 14, whereby heat energy directly radiated by its exposed face 18a coacts with the radiant heat energy emanating from the exposed face 14b of the inner wall material 14 to effect comfort heating. As appears more fully hereinafter, such radiant face 18a of the air-flow activating device 18 has a temperature higher than the average range of temperature of the radiant face portion 14a of the wall 10.

Such radiator or other flow-activating device, see particularly Figs. 3 and 5, is heated by any suitable thermal fluid, such as heated water, steam or the like. At 20a is indicated piping serving for the supply of such thermal fluid, any suitable valve indicated at 21 serving to control and regulate the inflow, of such thermal fluid into and through the radiator 18. At 20b is indicated the piping for the outflow of the thermal fluid. The body and/or the fins of such flow-activating device 18 is of suitable material such, for example, as cast iron for efficiently heating and thereby activating the flow of air by thermal exchange contact therewith.

The heat exchange fins 19 of such radiator, or other flow activating device, are preferably contoured and arranged in coordination with the character of the desired path of flow of the heated air or other activated medium. In the arrangement illustrated in Figs. 1 through 5, the fins 19 are of two sets for coordination with flow-control means composed of two sets of strips providing for central upward flow of the heated air over a path substantially within the margins of the lateral sides of the radiator, that is to say, of upward flow directly above the body of the radiator, and two paths of downward flow under condition of relatively lower temperatures of the flow-activated air toward and in return heat exchange flow relation with such two sets of fins, such cycle of positive flow of the flow-activated medium being repeated in recurrent heat exchange contact with the radiator.

One form of such flow-directing means, and in particular for coordination with a radiator having two sets of heat exchange fins, is illustrated in Figs. 1 through 5, and may comprise strip sets 22, 22a, and 23, 23a, extending vertically substantially at the margins of the respective lateral sides 18b, 18c of the radiator 18. The individual vertically related strips of each set, say the set 22, 22a are mutually vertically spaced with respect to one another, that is to say, the upper strip 22a, see Fig. 1, is spaced at its lower terminus 22A, from and above the upper terminus of the lower strip 22 by a clearance 24, which clearance 24, as appears more fully hereinafter, serves as a by-pass or an interlinking path of flow for the air or other activated medium. Also, the upper terminus 22B of such upper strip 22a is spaced by a clearance 25 from and between the upper marginal material 26 of the air-flow-activating chamber 17. The strips 23, 23a, of the coordinated set, cooperating with the stated set 22, 22a of the flow-directing means, are similarly related, and like clearances 24, 25, are provided for. Should a larger number of strips for each set of flow-directing means be desired, the same principle of clearances at vertical levels between the respective vertically successive strips and between the upper terminal of the uppermost strip and the upper marginal material of the air-flow-activating chamber, applies.

The upper wall of the flow-activating-chamber 17 is indicated at 26, being, advantageously, a portion of the ceiling structure of the room 11.

The lateral walls of the air-flow-activating chamber 17, of the structure illustrated in Figs. 1 through 5, are indicated at 27, 28. The lower wall of the chamber 17, of the structure illustrated in Figs. 1 through 5, is indicated at 29, being, advantageously, a portion of the floor structure of the room 11.

In coordination with such flow directing means, such two sets of fins 19 on the element 18 may be of arcuate configuration to define mutually therebetween passages 19a, which passages extend upwardly and preferably also in direction toward the central axis of the radiator to thereby increase the time period of heat exchange contact. The fins of any one set may be uniformly spaced from one another, to thereby provide for air flow passages of uniform width. Each fin may not necessarily be continuous over the face of the radiator, for example, we provide fins 19b which begin and end intermediate the locations of beginning and ending of the major number of fins, which are designated 19, a purpose of such fins 19b being to distribute more uniformly the air discharged through the clearance between the two sets of fins. While an arcuate formation is desirable for enhancing the flow of the air or other activated medium, it is understood that the formation of each fin and the special relationship of consecutive fins of each set may be other than of arcuate configuration, that is to say, of general character providing for an outflow of the heated air or other activated medium at a level higher than the inflow.

Accordingly, pursuant to the type of embodiment of the invention illustrated in Figs. 1 through 5, upon supply of the thermal fluid to such radiator 18, thereby elevating the temperature of the body of the radiator and therewith the two sets of fins 19, the air heated by such radiator and fins is activated in its flow through the passages 19a, or equivalent, defined by contiguous individual fins, the direction of flow through such passages being indicated by the applied arrowed lines, see Figs. 1 and 3, the thus flow-activated air entering the central channel, indicated as 30 in Fig. 1, the path of the lowermost portion of such air being indicated by the group of arrowed lines designated 30a. Upon such flow-activated air attaining the vertical level of the respective clearances 24, 24, a portion of such flow-activated air is diverted, as indicated by the arrowed lines 30b, to and through such clearances 24, 24, respectively, the remainder of such flow-activated air passing more upwardly through the channel 30, such more upwardly rising air being indicated by the arrowed lines designated 30c. The cooler and consequently heavier air in the upper portion of the enclosure and in the return passages 31 descends and displaces the warmer and consequently lighter air immediately adjacent and above the heat-emitting element 18, thereby causing upward movement of the warmer air over the rear face of the panel or wall 14. The cooler air which descends in the channels 31 contacts the heat-emitting element 18 and being heated thereby rises as heated air in the channel 30 and contacts the rear face of the element 14. This cycle continues until the temperature of the wall or panel 14 reaches an average temperature resulting in the heating effect desired. Such upward flow in the central channel 30 continues until such heated air attains the vertical level of the higher clearances 25, 25. In the instance illustrated, the upper marginal material 26 limits the upwardmost flow movement of such activated air, effecting flow of the air through such clearances 25, 25.

At the initial stage of supply of heated fluid to the radiator, the heating of the portion of the air in surface contact with the element 18, and consequent upward flow by convection of said air portions into the central channel 30, is induced by downward flow of relatively cooler portions of air in the respective lateral channels 31, 31, indicated by arrowed lines. Such upwardly flowing stream of heated air in the central channel 30, owing to the initial relative low temperature of the material of the exposed face 14a of the inner wall portion, is rapidly cooled, with the result that, as it approaches the upper portion of the enclosure, a major portion of the heated air of higher temperature rising in the central channel 30 is directly returned through the first level clearances or by-passes 24, 24, and, being by-passed or diverted downwardly into the cooler air in the channels 31, serves to induce and accelerate downward flow of the cooler air in said channels. The by-pass or diverter for the warmer air from the channel 30 is so located that the heated air which passes through it from channel 30 to 31 into the path of cooler air in the channels 31 tends to displace the cooler air from the bottoms of the channels 31 before the heated portion of the air has lost so much of its molecular activity that its specific gravity approaches that of the cooler air. However, upon recurrent air flow activated by continued heat exchange effected by the element 18 and consequent increase or rise of temperature of the lower portions of the material of the exposed face 14a and the also consequent rise of temperature of more upwardly disposed portions of the material of the exposed face 14a, the travel of the activated air in the central channel 30 increases more and more upwardly and to greater and greater proportion, until ultimately the whole of the material of the exposed face 14a is raised to the desired elevated temperature to effect the sought-for radiant distribution of heat energy into the room or other enclosure served by the installation.

In the installation illustrated in Figs. 1 through 5, see in particular Figs. 1 and 2, the air-flow-activating chamber 17 is defined by material serving per se as parts of the indicated wall 10. Such embodiment of the invention, also, extends from the floor level (viz. from the material 29 of the floor) to the ceiling level (viz. the material 26 of the ceiling) of the room or other enclosure served by the embodiment.

To enhance the air flow through the one or more vertically successive sets of clearances, in diverting flow through such interlinking passages, there may be provided as is indicated in Fig. 1 with respect to the clearances 24, 24, flow diverting means preferably in the form of arcuate or other suitably arranged strips 32. Each such flow-diverting element 32 may be positioned and/or secured at the lower terminus of its associated, therefrom upwardly extending, strip as is indicated in Fig. 1 with respect to the right hand flow-diverting strip 32, positioned at the lower terminus 22A of the strip 22a. These strips or diverters 32, are so curved and located that a portion of the air from the central stream is caused to flow downward in the channels 31 and by so doing act to accelerate flow of air from the upper portion of the enclosure down through the channels 31 and into recurrent heat transfer relation to the heat emitting element 18.

As is illustrated in Figs. 2 and 4 in particular, each vertically extending strip, viz. strips 22, 22a, 23, 23a, etc., and each flow-diverting strip 32, extends imperforately horizontally from the rearward wall of the air-flow-activating chamber 17 to the forward wall of the chamber 17, viz. in the latter instance, to the inner face of the material 14 constituting the inner facial material of the wall 10, so that the streams of air flow are separated from each other and caused to take definite paths.

Such arrangement of the invention may be embodied in similar manner for any desired additional panels or other portion or portions of any wall of a room or other enclosure. Also, the remaining walls, in whole or in part, of such room or other enclosure may be similarly equipped with the improved radiant heating means.

The arrangement illustrated in Figs. 6 and 7, taken in connection with Figs. 10, 11 and 12, is largely similar to that shown in Figs. 1 through 5, and described hereinabove; like parts are indicated by like reference characters. A distinguishing structural feature embodied in the arrangement illustrated in Fig. 6, is the employment of two radiators or equivalent, 18A, 18B, and therewith coordinated two upward channels 30, arranged laterally of a single central downflow channel 31. Such cooperating radiators 18A, 18B may be positioned side by side, the fins 19d of one radiator, say 18A, see Fig. 7, being constructed to intake relatively cooler air (from such central downflow channel 31) at its side toward the other radiator and discharge the thereby heated air into one upflow channel 30, the other radiator, i. e., the radiator 18B having its fins 19e constructed to intake relatively cooler air (from such central downflow channel 31) at its side toward the radiator 18A and discharge the thereby heated air into the other upflow channel 30, the respective paths of such air flow, including the air diverted through the interlinking by-pass passages 24, 24, being indicated by arrowed lines.

As above indicated, the hollow body-like structures comprised in the above described embodiments of the invention include material additionally serving as parts of the wall structure per se.

The radiators 18A and 18B are, in the illustrated embodiment, see particularly Figs. 10, 11, and 12, adapted for hot water heating. They are connected in series, the two forming the flow-activating means for any single radiant heating arrangement pursuant to Fig. 6. Additional sets of two radiators 18 may be connected in series with the set illustrated should it be desirable to provide additional radiant heating arrangements at other locations around the walls of the room 11.

Accordingly, diverter or by-pass channels 20—1 are provided preferably internally of the radiators. The by-pass channels connect at their respective inflow ends with the hot water supply piping 20a and at their outflow ends with the discharge piping 20b.

For controlling the supply of hot water to the various radiators, and particularly for controlling the supply of hot water to any given radiator or radiators of the system to the exclusion of the others, valve means are provided at the inflow ends of the by-pass channels 20—1.

Such valve means for any one radiator preferably takes the form of a flap valve 21' operable between a flow opening 18—1 leading to the radiator, and the inflow opening of the by-pass channel, the valve 21' being manually operable from the room by suitable handle means.

When the valve 21' is so adjusted as to direct hot water through the radiator, discharge therefrom into the outflow piping 20b is had through outflow openings 18—2.

Should it be desired to employ steam as the heating medium for the radiator, the openings 18—2 may be provided with suitable check valves to prevent back flow of steam into the radiator when the inflow opening thereto is closed.

In another exemplification of the invention, it is desirable to fabricate the heating means of the invention in the form of a unit, complete in itself. Such unit advantageously provides a chamber entirely enclosed in an air tight manner, and has at least one of its major faces formed by a heat radiant panel for exposure in the room to be heated. The entire unit may be incorporated in a wall of the room with its heat radiant panel forming a portion of the exposed face of the wall. Such unit embodiments of the invention are advantageous, in that the assembled unit is constituted of elements properly arranged and co-ordinated with one another to insure satisfactory performance when installed. Fig. 8 illustrates one type of such assembled unit, and corresponds in arrangement of individual parts generally to that illustrated in Figs. 1 through 5, like parts being designated by like reference characters. As is apparent from Fig. 8, the rear wall material 16a serves as a direct support of the marginal members 26, 27, 28, 29 respectively serving to enclose the space corresponding to the air-flow-activating chamber 17 of the embodiments shown in Figs. 1 through 6, through which chamber the flow-activated air is recurrently circulated in heat exchange facial contact with a suitable radiator 18, or equivalent. In such assembled unit, such rear wall material 16 serves also to support the strips or equivalent of the respective sets serving to direct the flow of the activated medium.

If desired, the face of the rear wall material 16a, which is exposed within such assembled unit, may be lined or otherwise treated to reflect radiant energy toward the panel which is exposed toward a room space.

In the installation, such unit may be incorporated in a wall. A suitable frontal panel, designated 14 in correspondence with the somewhat similar structural portions of the embodiments of Figs. 1 and 2, possessing the qualities of radiating heat energy when raised to proper range of elevated temperature, serves to complete enclosure of the space defined by the marginal members 26, 27, 28, 29. Such panel engages with free edges of the flow-diverting means, thus completing the formation of confining flow passages for the air or other flow-activated medium. The frontal panel, when the unit is incorporated in a wall, advantageously serves as a portion of the exposed face of the wall, that is to say, the face of the wall which is exposed to the room or other enclosure served by the installation.

Fig. 9 illustrates an embodiment of the invention applicable to a wall, partition or the like, the respective opposed faces 14a, 14a, of which are exposed in adjacent rooms and/or other enclosures of the building or other structure. In such arrangement, if desired, the radiator 18 or equivalent may be provided with the desired sets of fins or other extended surface 19, 19, projecting from opposite faces of the body of the radiator or equivalent, thereby providing dually related heat exchange elements serving to activate circulatory flow of the full quantum of air within the space between the opposite exposed faces, 14a 14a, of such wall structure.

Fig. 9 illustrates also the assembly of a radiator which is bodily, as well as its fin structure, wholly enclosed within the air-flow-activating chamber in which the air or other flow-activated medium is entrapped. Such arrangement, as is illustrated in Fig. 9, is typical of the types of structures wherein it is not desired to expose any face or other portion of the radiator or equivalent to the air interiorly of the room or other enclosure. In such type of embodiment, the lowermost portion of the wall material 14 may be faced, as indicated in Fig. 9 with a base board indicated at 33 or otherwise.

As appears from the above, embodiments of the invention afford elevation of temperature of one or more walls of the room served by such embodiments, throughout the exposed face of such panel or panels and over a range of distributed facial temperature, yielding comfort heating to occupants of such room, notwithstanding that the temperature of the air of the room be reduced definitely below the present day accepted range of comfort temperature had by conventional heating means. The invention, therefore, enables fresh air to be introduced into such room in enlarged proportions, with attendant lowered temperature of the room air with consequent improved health advantages, such introduced fresh air and/or the intermixed fresh air and room air being preferably conditioned with respect to moisture content and other comfort affecting factors.

Whereas this invention has been illustrated and described with respect to specific embodiments thereof, it is to be clearly understood that many changes may be made without departing from the generic aspects of the invention as indicated herein and as set forth in the claims that follow.

We claim:

1. Heating means comprising a substantially air tight hollow enclosure having a facial wall adapted to form a wall surface of a room, said facial wall being of a material capable of radiating heat energy, a flow activating device including a heat emitting element in said enclosure and located at the base thereof and acting when emitting heat to create an upwardly flowing stream of heated air in contact with the inner face of said facial wall, and means in the enclosure whereby said stream acts to accelerate a downward flow of air from the upper portions of said enclosure and into recurrent heat transfer relation to said heat emitting element.

2. Heating means comprising a substantially air tight hollow enclosure having a facial wall adapted to form a wall surface of a room, said facial wall being of a material capable of radiating heat energy, a flow activating device including a heat emitting element in said enclosure and located at the base thereof and acting when emitting heat to create an upwardly flowing stream of heated air in contact with the inner face of said facial wall, partition means in said enclosure for directing said stream of heated air toward the upper portion of said enclosure, a return passage from said upper portion for downward passage of air, and means in said partition for by-passing a downwardly directed stream of air from said upwardly flowing stream of heated air into said return passage to thereby accelerate flow of air from such upper portion of said enclosure and down through said return passage into recurrent heat transfer relation to said heat emitting elements.

3. Heating means comprising a relatively thin box-like hollow structure including exposed panel wall means of suitable material capable of radiating heat energy outwardly from the hollow of said structure, said structure extending substantially solely in a substantially vertical plane, being substantially air tight, and containing a fluid medium, a heat emitting device disposed within said structure and having heat exchange faces which constitute flow-directing means, said heat exchange faces being arranged to activate flow of said fluid medium within the hollow of said structure in recurrent heat exchange relation with said heat emitting device.

4. Heating means comprising a relatively thin box-like hollow structure including exposed panel wall means of suitable material capable of radiating heat energy outwardly from the hollow of said structure, said structure extending substantially solely in a substantially vertical plane, being substantially air tight, and containing a fluid medium, a heat emitting device disposed within said structure and having heat exchange faces which constitute flow directing means, said heat exchange faces being arranged to activate flow of said fluid medium within the hollow of said structure in recurrent heat exchange relation with said heat emitting device, said heat exchange faces being formed by a plurality of elements mutually spaced from one another to define paths of flow in substantial continuity with the paths of flow followed by said fluid medium as it circulates within the hollow of said structure.

5. Heating means comprisng a relatively thin box-like hollow structure including exposed panel wall means of suitable material capable of radiating heat energy outwardly from the hollow of said structure, said structure extending substantially solely in a substantially vertical plane, being substantially air tight, and containing a fluid medium, a heat emitting device disposed within said structure and having heat exchange faces which constitute flow-directing means, said heat exchange faces being arranged to activate flow of said fluid medium within the hollow of said structure in recurrent heat exchange relation with said heat emitting device, said heat emitting device including exposed substantially planar heat exchange facial means disposed in substantially vertical alignment with said panel wall means of said structure.

6. Heating means comprising a relatively thin box-like hollow structure including exposed panel wall means of suitable material capable of radiating heat energy outwardly from the hollow of said structure, said structure extending substantially solely in a substantially vertical plane, being substantially air tight, and containing a fluid medium, a heat emitting device disposed within said structure and having heat exchange faces which constitute flow-directing means, said heat exchange faces being arranged to activate flow of said fluid medium within the hollow of said structure in recurrent heat exchange relation with said heat emitting device, mutually spaced upwardly extending strip elements disposed within the hollow of said structure serving to direct flow of said fluid medium substantially throughout the hollow of said structure, said heat exchange faces providing paths of flow in substantial continuity to the paths of flow followed by said fluid medium as it circulates within the hollow of said structure.

7. Heating means comprising a relatively thin box-like hollow structure including exposed panel wall means of suitable material capable of radiating heat energy outwardly from the hollow of said structure, said structure extending substantially solely in a substantially vertical plane being substantially air tight, and containing a fluid medium, a heat emitting device disposed within said structure and having heat exchange faces which constitute flow-directing means, said heat exchange faces being arranged to activate flow of said fluid medium within the hollow of said structure in recurrent heat exchange relation with said heat emitting device, mutually spaced upwardly extending elements disposed within the hollow of said structure providing a plurality of circulatory paths of flow for said fluid medium substantially throughout the hollow of said structure, said heat emitting device including exposed substantially planar heat exchange facial means disposed in substantially vertical alignment with said panel wall means of said structure.

8. Heating means comprising a relatively thin box-like hollow structure including exposed panel wall means of suitable material capable of radiating heat energy outwardly from the hollow of said structure, said structure extending substantially solely in a substantially vertical plane, being substantially air tight, and containing a fluid medium, a heat emitting device disposed within said structure and having heat exchange faces which constitute flow-directing means, said heat exchange faces being arranged to activate flow of said fluid medium within the hollow of said structure in recurrent heat exchange relation with said heat emitting device, a plurality of mutually spaced sets of vertically spaced and aligned upwardly extending substantially rectilinear strip elements disposed within the hollow of said structure serving to direct flow of said fluid medium substantially throughout the hollow of said structure, and flow deflecting means associated with said upwardly extending substantially rectilinear elements at the location of vertical spacing thereof, said flow deflecting means being so constructed and arranged as to direct flow of a portion of upwardly flowing heated fluid medium into the path of downwardly flowing fluid medium.

9. Heating means for room spaces comprising a hollow panel wall structure adapted to form at least a substantial portion of an upright side wall of a room and including a side wall part facing the room and capable of radiating heat energy outwardly from the hollow of said structure and into the room, said structure being substantially air tight and containing a fluid medium capable of absorbing and giving up heat energy by convection, an upright partition wall dividing the hollow interior of said structure into juxtaposed up-going and down-coming passages of substantial lengths, respectively, and both passages being defined at one side thereof by said side wall part, said partition wall being so constructed as to provide communication between the up-going and down-coming passages at their upper and lower ends, respectively, and thereby form a closed continuous path for said fluid medium extending in directions parallel to the plane of said side wall part, and a heat-emitting device including heat dissipating surfaces arranged in the lower part of said up-going passage and in position to be contacted with said fluid medium therein, whereby a continuous gravity flow of the fluid medium along said path is assured and the heat energy absorbed by said fluid medium from said device is given up to said side wall part.

WILLIAM WALTER TIMMIS.
MAURICE A. MICHAELS.